United States Patent Office 3,291,627
Patented Dec. 13, 1966

3,291,627
NITROCELLULOSE DISPERSIONS
Eugene C. Hamilton, Wilmington, Del., assignor to Hercules Incorporated, a corporation of Delaware
No Drawing. Filed Dec. 13, 1962, Ser. No. 244,262
4 Claims. (Cl. 106—195)

This invention relates to dispersions of finely divided particles of nitrocellulose in a non-polar, volatile organic liquid, which dispersions are useful plastic compositions, and are particularly useful as components of a new and improved type of wood filler composition herein described.

Prior to this invention, much work has been done on the preparation of finely divided nitrocellulose but none of this work has resulted in nitrocellulose particles that retain the inherent fibrous nature of the nitrocellulose in a particle size useful as a plastic filler composition.

According to one proposal finely divided nitrocellulose is produced by spray drying a nitrocellulose solution. This results in a heterogeneous mixture of solid particles, hollow spheroids, and fine threads of average particle size 15 to 30 microns with some particles ranging in size up to about 180 microns.

It has also been proposed to prepare finely divided nitrocellulose particles by dissolving the nitrocellulose in suitable volatile solvent mixtures and then forming an emulsion or dispersion of droplets of the resulting nitrocellulose solution in water, removing the solvent by spray drying, emulsion boil-off, flash evaporation, spraying into a steam atmosphere, etc., after which the nitrocellulose precipitates in fine particle form. This method produces more uniform particles with respect to particle size and configuration but the particles are still non-fibrous and relatively large.

In a recent, as yet unpublished, improvement in the art of forming dispersions of small particle size nitrocellulose, a technique has been developed wherein fibrous nitrocellulose is subjected to a crushing or grinding force in a polar liquid non-solvent medium such as water or an aliphatic alcohol. The crushing or grinding force can be provided by a ball mill or the like. Substantially all of the particles resulting from such crushing in a ball mill using a polar liquid non-solvent medium are of extremely small size, i.e., less than 3 microns in at least one dimension. The dispersions that result are useful primarily as coating compositions.

It has now been discovered that dispersions of fibrous nitrocellulose of average particle size about 3 to 5 microns can be produced by subjecting fibrous nitrocellulose to a crushing or grinding force in the presence of a volatile, non-polar organic liquid which is a non-solvent for the nitrocellulose and in which the nitrocellulose swells to only a minimal degree.

In the practice of this invention, a slurry of fibrous nitrocellulose in a non-polar organic liquid which is a non-solvent for the nitrocellulose is charged to a ball mill or a hammer mill or equivalent apparatus employing the principle of comminuting by application of repeated crushing forces to the substance being comminuted. The nitrocellulose is subjected to the comminuting force until the particle size becomes substantially constant. When a non-polar slurrying medium is employed, this constant state is reached at an average particle size of about 3 to about 5 microns with a particle size range of about 0.1 to 15 microns. The progress of the comminuting operation is followed by periodic sampling and microscopic analysis.

The finely divided nitrocellulose particles employed in the dispersions of the invention can be produced from any fibrous nitrocellulose obtained by nitrating natural cellulose fibers, such as cotton, purified cotton linters, purified wood pulp, and the like, in such forms as picked linters, shredded wood pulp, fluffed bulk fibers, finely ground or cut fibers, cubed or granulated fiber aggregates, and the like. In short, substantially any of the industrial types and grades of fibrous nitrocellulose are suitable for the purposes of this invention, having nitrogen contents from about 10.9% to about 13.5% nitrogen, and viscosity characteristics from 10 centipoise type to 1,000 second type.

One very important requirement in producing the dispersions of this invention is that the major portion of the volatile organic liquid used as the dispersing medium for the finely ground nitrocellulose particles must be a non-polar liquid. Typical materials meeting this requirement and a preferred class of such materials are the liquid aliphatic and aromatic hydrocarbons. These include such compounds as V.M. & P. naphtha (generic name for a paint and varnish grade naphtha boiling in the range 195–330° F.), toluene, benzene, mineral spirits (B.P. range 300–400° F.), xylene, and the like.

It is permissible in some instances to have a minor amount of a polar organic non-solvent included in the dispersing medium. This is not necessarily desirable but since commercial nitrocellulose is often shipped in alcohol wet condition, there are instances where the presence of the polar organic non-solvent may be unavoidable. However, the amount of this polar liquid must be kept to a maximum of not more than about 25% by weight of the total liquid phase. If the amount of polar liquid in the liquid phase exceeds this, some solvation of the nitrocellulose may occur and comminution will be adversely affected.

In addition to being a non-solvent for nitrocellulose, the volatile organic liquid used as the dispersing medium must also be one which does not swell or soften the nitrocellulose appreciably. It has been found that any substance which has solvent, swelling, or softening action on the fibrous nitrocellulose to any appreciable degree interferes with satisfactory comminution action. Generally, the presence of such agents interferes with reduction of the fibrous nitrocellulose to a sufficiently small particle size.

A further requisite of the process of this invention is that the fibrous nitrocellulose suspended in a non-solvent slurrying medium must be subjected to repeated forceful crushing impacts to fracture the nitrocellulose fibers into suitable small fragments. Any conventional device capable of delivering such crushing impacts is suitable for the purposes of this invention, such as, for example, ball mills, hammer mills, levigators, and the like. Ball milling the slurry of the fibrous nitrocellulose has proven to be eminently satisfactory for accomplishing the necessary repeated crushing impacts to fracture the nitrocellulose fibers into suitable small fragments. In general the larger the ball mill, the shorter is the time of ball milling required to accomplish the desired comminution. The progress of the comminution can be effectively followed and controlled by taking samples at intervals during the comminution for microscopic measurement of fragment sizes. When the mill and/or balls are of a corrodible nature, as for example, a steel mill and/or steel balls, it is highly desirable to incorporate conventional corrosion inhibitors, such as sodium nitrite, polysodium hexametaphosphate, sodium benzoate, trisodium phosphate, and the like, into the comminuting slurry to inhibit corrosion. It is also desirable to employ an inert atmosphere, such as nitrogen, in the free space in the mill.

It has been found that frictional grinding action, such as is obtained in a differential two-roll mill, or between differentially rotating grinding plates or discs does not fracture the nitrocellulose fibers into tiny fragments suitable for the purposes of this invention.

From an economic standpoint, it is desirable to practice the comminution process of this invention with slurries containing as much fibrous nitrocellulose as practicable, and the upper practical limit for the amount of nitrocellulose in the slurry is governed by the ability to agitate the slurry effectively. For example, when a ball mill is employed for comminuting the nitrocellulose fibers, the slurry should be sufficiently fluid so that the balls can fall effectively to deliver the necessary crushing impacts on the nitrocellulose fibers. Generally, slurries containing between about 20% and about 35% by weight of fibrous nitrocellulose have been employed. Slurries containing less than about 20% of nitrocellulose fibers can be employed, but there is no advantage to be gained thereby. Furthermore, the invention is not limited to a maximum of 35% by weight of nitrocellulose in the slurry, since the uper practical limit is governed only by the ability to agitate the slurry effectively. Generally, the shorter the fibers of nitrocellulose, the greater is the amount of nitrocellulose which can be incorporated into the comminuting slurry.

Comminution by subjecting the nitrocellulose fibers to repeated crushing impacts is carried out until microscopic examination of a representative sample of the slurry shows that substantially all of the nitrocellulose fibers have been fractured into tiny irregular fragments, a substantial majority, on the order of 95–99% or more, of which have a distribution of particle sizes in the range from about 3 to about 5 microns in all three dimensions. It will be evident that the time required to accomplish this degree of comminution will vary, depending on such factors as the particular fibrous nitrocellulose employed, the particular slurrying medium selected, the particular device employed to comminute the nitrocellulose fibers, etc. Hence, the practical method for following the course of the comminution is to take representative samples of the nitrocellulose slurry at intervals during the comminution, and examine the same microscopically to determine the degree of comminution obtained.

The following examples illustrate the formation of the nitrocellulose dispersions of this invention. Parts and percentages are by weight unless otherwise specified. Viscosities of the nitrocellulose used in each example were determined by ASTM D301–56.

*Example 1*

Four hundred and thirty (430) grams of ethanol wet (30%) nitrocellulose (12% N, 0.25 second viscosity) and 570 grams of V.M. & P. naphtha (B.P. range 195–330° F.) were charged to a one-gallon pebble mill containing 2500 grams of ⅝" porcelain pebbles and ground for five days at 60 r.p.m. A stable dispersion containing about 30% by weight of nitrocellulose of average particle size of about 5 microns resulted. The particle size range was from about 0.1 to 15 microns.

*Example 2*

Five hundred (500) grams of isopropanol wetted (30%) nitrocellulose (11% N, 30 cp. viscosity) and 500 grams of V.M. & P. naphtha were charged to a one-gallon pebble mill containing 2500 grams of ⅝" porcelain pebbles and ground for five days at 60 r.p.m. A stable dispersion containing about 35% by weight of nitrocellulose of particle size about 4 microns results.

While the dispersions of the invention possess a variety of uses, they are particularly useful as components of wood filler compositions as will be shown in the following discussion.

In the finishing of open-grained woods, such as walnut, mahogany, oak, or the like, it is usually necessary to fill the pores of the wood with a filler before applying the lacquer sealer and finish coats. Conventional fillers are composed of extender pigments, color pigments, drying oils, driers, and volatile solvents. The filler is applied by brush or spray and the volatitle solvent is permitted to "flash dry" or evaporate. When the solvent has evaporated, the partially dried filler is rubbed into the pores of the wood and any excess is removed. The filled wood must then stand for several hours or even overnight so that the drying oils in the filler may oxidize to form a film and bind the pigments firmly to the wood. The wood is then ready for application of lacquer sealers and finish coats.

Conventional oil base fillers have several undesirable features. Among these is the excessively long waiting period required between application of the filler and application of the finishing coats. A filler which could be lacquered substantially immediately after application would have distinct economic advantages to those engaged in wood finishing operations.

Another undesirable characteristic of the oil-based wood fillers is their relatively poor adhesion to nitrocellulose lacquer finish coats. This poor adhesion is a result of the incompatibility of the oxidized drying oil with the overlying nitrocellulose lacquer.

Both of the aforesaid disadvantages can be overcome by using a nitrocellulose solution as a vehicle in the filler composition. Wood filler compositions consisting of such nitrocellulose vehicles have been proposed and are known in the art. However, application of these compositions is difficult because the nitrocellulose, being in solution, tends to form a film as the volatile solvent evaporates. As a result of this film formation, the filler becomes hard and unworkable in a relatively short time after its application to the wood. Thus, the time lapse between application of the filler and the wiping step is extremely critical. Wiping must be complete before the solvent has evaporated. For this reason, such compositions, in spite of their obvious advantages over oil-based filler systems, have not become very popular in the trade.

As a result of the poor results experienced with conventional fillers and with fillers based on nitrocellulose solutions, it has been recognized that the most satisfactory system would be one that included the good adhesion characteristics of the nitrocellulose fillers with the less critical wiping time of the oil-based system.

It has been found that excellent wood filler compositions can be formulated by blending the dispersions of this invention with a nitrocellulose plasticizer and pigments. (The term pigments is intended to include solid, inorganic materials in general, whether it be a coloring material such as iron oxide or simply an extender having no coloring power such as silica or talc.)

The nitrocellulose, being in particle form, has no tendency to form a film at the time of its application to the wood, and thus there is no problem of its becoming unworkable if the time interval between application and wiping is too great. After application of the filler to the wood and wiping to fill the pores and to remove the excess, fusion of the nitrocellulose particles to form a film is accomplished by coating the filled and wiped surface with a nitrocellulose solvent or a nitrocellulose lacquer. If the nitrocellulose lacquer, sealer, or top coat is applied in the usual fashion, the fusion of the nitrocellulose in the pores of the wood will occur as an ancillary effect of the coating operation due to contact with an active solvent.

It can be seen that such a filler composition overcomes the two objections outlined above to most of the known wood filler compositions. Since there is no necessity for oxidizing or curing of any component of the filler system, there is no necessity for allowing any appreciable length of time to transpire between the application of the filler and the application of the finish coats. The finish coat can be applied substantially immediately. In addition, the adhesion between the filler coat and the finish coats will be much stronger since the nitrocellulose contained in the filler and that contained in the laquer fuse to form a common film.

The plasticizer employed in the wood filler compositions may be any of the known liquid plasticizers for nitrocellulose which are either non-solvents or at most only weak solvents for nitrocellulose but which are miscible with the liquid organic dispersing medium. Examples of classes of compounds which have been found useful in this application include raw or modified non-drying oils, alkyds, higher glycol ether-esters, pentaerythritol esters, and liquid rosin esters. Some specific examples from these classes include butyl Cellosolve stearate, butyl Cellosolve oleate, sebacic acid alkyds, butyl acetyl ricinoleate, raw castor oil, fractionated linseed oil, Cellosolve ricinoleate, and dipentaerythritol hexapropionate.

The plasticizer may be blended with the nitrocellulose dispersion after the comminution step or it may be charged to the pebble mill so that the nitrocellulose dispersing medium is a plasticizer-non-solvent mixture.

Formulation of the dispersion in a plasticizer-nonsolvent mixture is shown by the following examples.

*Example 3*

Three hundred and eighty-two (382) grams of ethanol wet (30%) nitrocellulose (12% N, 0.25 sec. viscosity), 223 grams of the methyl ester of rosin (plasticizer) and 395 grams of V.M. & P. naphtha were charged into a one-gallon pebble mill containing 2500 g. of ⅝" porcelain pebbles and milled for 48 hours. A stable dispersion containing about 26.7% nitrocellulose of particle size about 5 microns resulted.

*Example 4*

The same mix as that shown in Example 3 using isopropanol wet nitrocellulose (11% N, 30 cp. viscosity) was charged to the mill and ground for 48 hours. A stable dispersion containing about 26.7% nitrocellulose of particle size about 5 microns resulted.

The dispersions produced by either technique are formulated into wood filler compositions by simple mixing with the desired pigments. The most satisfactory filling of the wood pores is obtained with pigments having average particle size in the 25–50 micron range. It is, therefore, not desirable to mill the pigments in the ball mill when the nitrocellulose is being milled and dispersed. The mixing is most satisfactorily accomplished by simple mixing as with a pony-type mixer.

The following examples show some typical wood filler formulations making use of the dispersions of this invention.

*Example 5*

A wood filler having the following composition was prepared.

| Material: | Parts by weight |
|---|---|
| Dispersion of Example 3 | 46.0 |
| Silica | 42.0 |
| Fibrous talc | 9.5 |
| Brown iron oxide | 0.5 |
| Mineral spirits | 2.0 |

The materials were charged into a pony-type mixer and mixed for twenty minutes until a uniformly mixed, flowable composition resulted. Wood panels were filled with this composition and finish coated with a standard commercial nitrocellulose laquer. The composition exhibited excellent application, filling and adhesion characteristics.

*Example 6*

The same formulation as that of Example 5 was prepared using the dispersion of Example 4 instead of that of Example 3. Due to the presence of the low nitrogen content nitrocellulose in this dispersion, the filler composition had a slightly lower consistency. However, the wood filling perfromance of the two compositions was indistinguishable, the same excellent results being obtained.

*Example 7*

Thirty-seven (37.0) grams of the dispersion prepared in Example 1, 26 grams of the methyl ester of rosin, 29.5 grams of silica, 7.0 grams of fibrous talc and 0.5 gram of brown iron oxide were charged to the pony-type mixer. The charge was mixed for 20 minutes until a smooth, flowable mixture was formed. This filler exhibited excellent working properties and good adhesion and filling properties.

*Example 8*

Sixty-nine (69.0) grams of the dispersion prepared in Example 1, 7.8 grams of the methyl ester of rosin, 18.5 grams of silica, 4.4 grams of fibrous talc and 0.3 gram of brown iron oxide were mixed as in Examples 5, 6 and 7. This composition exhibited excellent adhesion and good working and filling properties.

*Example 9*

Fifty-five and two-tenths (55.2) grams of the dispersion of Example 1, 6.2 grams of blown castor oil, 14.8 grams of silica, 3.5 grams of fibrous talc, 0.3 gram of brown iron oxide, and 20.0 grams of toluene are charged to the mixer and mixed in the same manner as in the previous examples. The performance of this composition was similar to that exhibited by the composition of Example 8, i.e., excellent adhesion and good working and filling properties.

In the preparation of wood filler compositions using the dispersions of this invention, the compositions can be varied through a broad range of pigment-nitrocellulose-plasticizer ratios to produce useful wood filler formulations. However, for the best combination of properties, the following minimum amounts of the various components are preferred. For the optimum filling properties, pigment content should be at least about 50% by weight based on the total weight of pigment, nitrocellulose and plasticizer. For optimum application and wiping characteristics, plasticizer content should be at least 10%. For optimum adhesion, nitrocellulose content should be at least 10%. The proportion of volatile diluent is simply a matter of obtaining the desired paste-like consistency for ease of application.

What I claim and desire to protect by Letters Patent is:

1. A wood filler composition comprising a dispersion of nitrocellulose particles having an average particle size of about 3 to 5 microns in a non-polar volatile organic liquid, a nitrocellulose plasticizer, and pigment.

2. A wood filler composition comprising a paste-like dispersion of nitrocellulose particles having an average particle size of about 3 to 5 microns in a non-polar volatile organic liquid, a nitrocellulose plasticizer, and pigment, the said nitrocellulose and nitrocellulose plasticizer, each comprising at least about 10% by weight of the total solids content of the composition, the pigment comprising at least about 50% by weight of the said total solids content, the non-polar volatile organic liquid being present in sufficient quantity to maintain the desired paste-like consistency.

3. The wood filler composition of claim 2 wherein the plasticizer is a rosin ester.

4. The wood filler composition of claim 2 wherein the non-polar volatile organic liquid is the naphtha fraction boiling in the range of about 195° F. to 330° F.

References Cited by the Examiner

UNITED STATES PATENTS

| 1,744,699 | 1/1926 | Haines | 106—195 |
| 3,087,835 | 4/1963 | Auer | 106—195 |
| 3,098,053 | 7/1963 | Hallonquist | 106—195 |
| 3,198,645 | 8/1965 | Plunguian | 106—195 |

ALEXANDER H. BRODMERKEL, *Primary Examiner.*

J. H. WOO, *Assistant Examiner.*